United States Patent [19]  [11] 4,127,564
Sanborn  [45] Nov. 28, 1978

[54] MELT PROCESSING RECOVERY OF HIGH PURITY POLYMERIC ANTIOXIDANTS

[75] Inventor: William L. Sanborn, Saratoga, Calif.

[73] Assignee: Dynapol, Palo Alto, Calif.

[21] Appl. No.: 694,504

[22] Filed: Jun. 9, 1976

[51] Int. Cl.² .................... C08G 65/40; C08K 5/13
[52] U.S. Cl. ................................ 528/481; 252/404; 260/96 R; 528/219; 528/218; 528/501
[58] Field of Search ............... 260/62, 47 UP, 47 UA, 260/96 R, 45.95; 252/404; 528/481; 526/338; 426/546

[56] References Cited
U.S. PATENT DOCUMENTS 3,996,160  12/1976  Dale et al. ........................ 252/404
3,996,198  12/1976  Wang ................................. 260/62
3,996,199  12/1976  Weinshenker ................. 260/47 UA Primary Examiner—Theodore A. Pertilla
Attorney, Agent, or Firm—William H. Benz

[57] ABSTRACT

Diolefin-phenolic copolymeric antioxidants having solvent contents below 50 ppm and containing less than 0.3% of materials of molecular weight below 500 Daltons are recovered directly from a crude reaction product by removing catalyst and adjusting the reaction solvent content to 10–50% and thereafter subjecting the product to melt processing under volatilizing conditions at 200°–425° C, 0.1 to 10 mm Hg absolute, a surface area of at least 4 cm²/g for from 0.5 to 7.5 minutes and then recovering the purified product.

8 Claims, 1 Drawing Figure

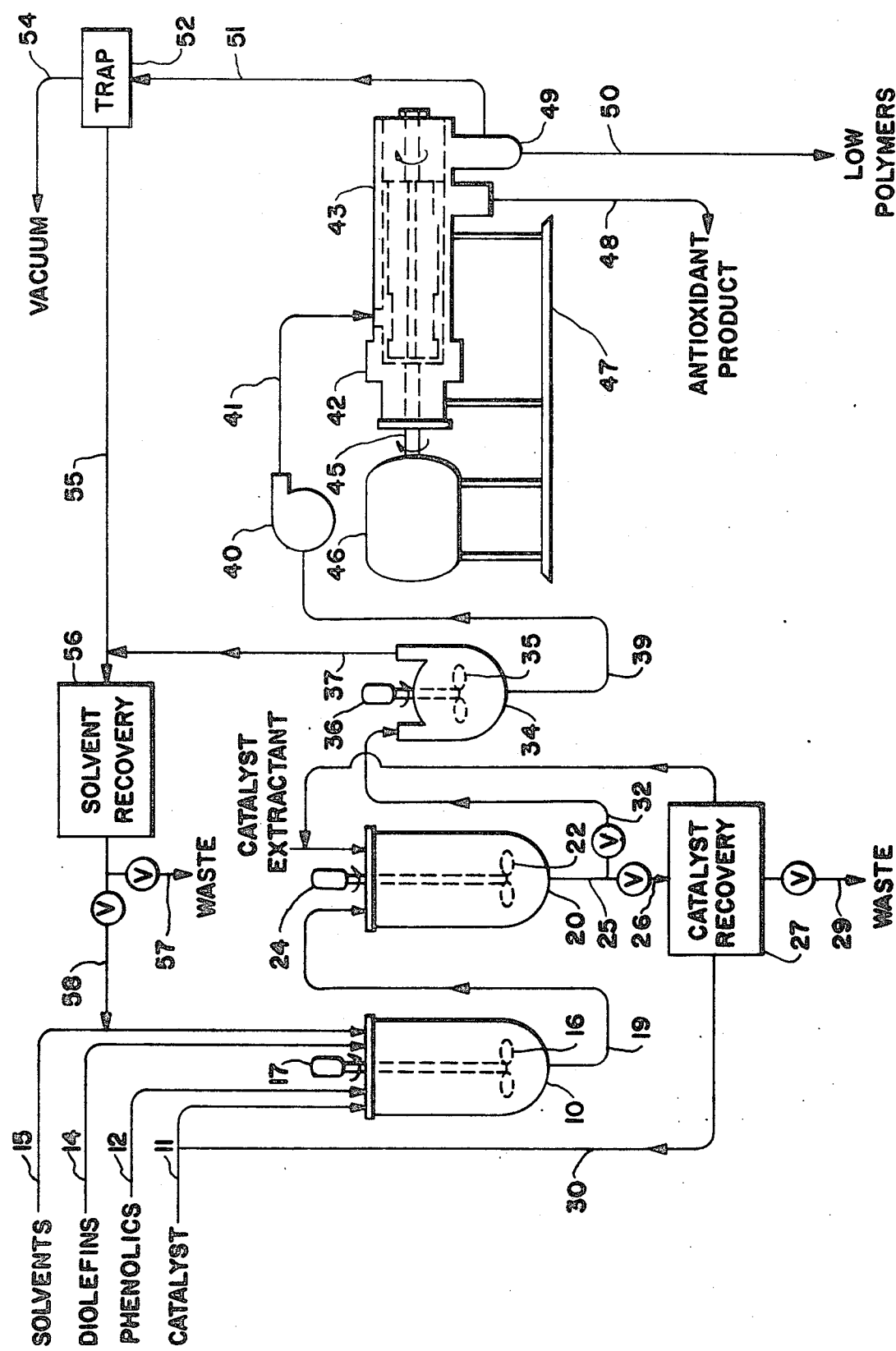

MELT PROCESSING RECOVERY OF HIGH PURITY POLYMERIC ANTIOXIDANTS

BACKGROUND OF THE INVENTION

1. Field of the Invention

This invention pertains to the recovery of polymeric antioxidants. More particularly, it pertains to a method for isolating in essentially pure form solid polymeric antioxidants having minimal amounts of low molecular weight contaminants from a liquid phase polymerization reaction mixture.

2. Discussion of Prior Art

Recently, it has been shown by U.S. Pat. No. 3,930,047 of Dale et al and by South African Pat. No. 74/3548 of Zaffaroni that certain polymeric antioxidants offer special advantages in edibles. These references taught that questions of systemic toxicity can be eliminated if antioxidants maintain a molecular size which is larger than can be passed through the walls of the gastrointestinal tract. These references as well as other references disclosed the formation of large antioxidants by the polymerization and copolymerization of small antioxidant species. With any known polymerization technique, some monomers, dimers and trimers and other low (500 Daltons or less) molecular weight species will be present in the reaction product. These materials must be minimized if desired low gastrointestinal absorption is to be obtained. Also, in a food grade product it is desirable to minimize product contamination by solvents and reaction media.

One conventional way to minimize monomers and other low molecular weight species is to carry out the reaction under conditions which lead to very high average molecular weights for the polymer products. This offers the disadvantage of yielding a product which is not acceptably soluble in many edible oils. Another way to obtain a suitable product is to fractionally precipitate the high molecular weight material from an organic nonsolvent.

In using this precipitation method to isolate large batches of diolefin-phenolic copolymeric antioxidants, several problems were found. First, the precipitation had to be carried out under very dilute conditions with organic solvents and diluents to achieve the desired fractionation. This led to low yields of the desired antioxidant product. This required expensively large equipment for the precipitation itself and for liquid recovery as well as large liquid use rates even with efficient operation. Second, the precipitate product was a sticky wet cake which could be dried only with difficulty. Residual liquid levels were higher than desirable for a food grade product except under the most rigorous laboratory-type processing conditions. Clearly, a method of recovery which would minimize the expense and wastefulness of these separate precipitation and drying steps would be a useful improvement in the preparation of diolefin-phenolic polymeric antioxidants.

STATEMENT OF THE INVENTION

I have now discovered an effective and efficient method for recovering diolefin-phenolic copolymer antioxidants. With this method, the crude polymerization reaction product, after being freed of polymerization catalyst, and containing up to about 50% by weight of solvents and liquid organic diluents is directly subjected to a melt processing technique. This melt processing comprises heating the reaction product to a temperature above the copolymer's fusion point but below about 425° C. The melted reaction product is held in this temperature range for from 0.5 to 7.5 minutes while a 0.1 to 10 mm Hg absolute pressure is applied. For best results, the melt is mixed and maintained in a high surface area (at least 4 square cm per gram) configuration. As will be noted, this method completely eliminates the troublesome precipitation and separate drying steps. It can yield a polymer product containing less than 50 ppm of residual solvents and less than 0.3% of polymer having a molecular weight below about 500 Daltons.

REFERENCE TO RELATED PATENT APPLICATIONS

Certain subject matter in this specification is disclosed in copending and commonly assigned patent applications of others. U.S. Ser. No. 552,017 filed Feb. 24, 1975 by James A. Dale and Patricia Wang issued Dec. 6, 1976 as U.S. Pat. No. 3,996,160; and U.S. Ser. No. 658,943 filed Feb. 17, 1976 by Ned M. Weinshenker et al issued Dec. 6, 1976 as U.S. Pat. No. 3,996,199; disclose certain antioxidant compounds which are among the materials which may be advantageously recovered by the present process.

DETAILED DESCRIPTION OF THE INVENTION

Brief Description of the Figure

In this Detailed Description, reference shall be made to the drawing, the sole FIGURE of which is a schematic elevational view of a typical apparatus for effecting the melt processing recovery of the present invention.

The antioxidants which are recovered by the present melt processing technique may be broadly classified as diolefin-phenolic condensation products. These products are fully defined in the section of this Detailed Description denominated as The Antioxidant Products. The products are formed by condensing diolefin with one or more phenolics (this term is defined to include substituted and unsubstituted hydroxyaromatics) with a Lewis acid or metal "phenol orthoalkylation catalyst" in a liquid phase reaction medium.

Prior to practicing the recovery process of this invention on such a reaction product, the catalyst is removed, usually by extraction. Also, it is preferred that the solvent and diluent content of the reaction product be adjusted, generally by simple vacuum stripping, to a level of less than about 50% by weight as an optional first step of the present process.

Process Conditions

In the practice of this recovery process, the catalyst-free polymeric antioxidant is exposed as a melt to a relatively high temperature and vacuum for a relatively brief time. This exposure takes place under volatilizing conditions and high surface area conditions, preferably with agitation. The temperature suitably is in the range of from about 200° C. to about 425° C. Temperatures of from 250° C. to 400° C. are preferred. A most preferred temperature range is from 300° C. to 375° C. These temperatures are wall temperatures. The actual temperature of the antioxidant will be somewhat lower as a result of cooling caused by the evaporation of solvents, monomers and low weight polymers. For example, a wall temperature of 365° C. yields a bottoms product temperature of about 330°-335° C.

The vacuum employed will generally fall in the range of from about 0.1 mm Hg absolute to about 10 mm Hg absolute. Absolute pressures below 0.1 mm are very satisfactory as well but are difficult to achieve in commercial scale equipment with substantial solvent and monomer partial pressures being exhibited. Pressures above 10 mm Hg absolute are to be avoided as it is generally not possible to obtain desired removal of low molecular weight polymer contaminants at higher pressures without resorting to too high temperatures or too long residence times. Preferred absolute pressures are in the range of from about 0.1 mm Hg to about 5 mm Hg with 0.5 mm Hg to 3 mm Hg being a most preferred range.

The time during which the antioxidant is exposed to high temperature should be limited as much as possible. Generally, times at temperature of from about 0.5 minutes to 7.5 minutes are acceptable, with times from 1 minute to 5 minutes and especially 1.5 to 3.5 minutes being preferred. It is to be understood, of course, that in the case of continuous processing these times would be mean times.

The antioxidant is treated in a "thin film" configuration rather than in a "bulk" form. The antioxidant during treatment should have a surface area of at least 4 cm$^2$/gram, and preferably of at least 6 cm$^2$/gram and more preferably of at least 8 cm$^2$/gram. To obtain reasonable processing rates, it is generally desirable to limit surface area to a maximum of about 30 cm$^2$/gram. These conditions can be attained in "thin film" evaporators such as horizontal or vertical wiped film evaporators, multiple screw extruder evaporators, or the like. Falling film evaporators generally are not acceptable since the resulting film is generally not sufficiently uniform and scorching can develop. Of these types of apparatus those, such as wiped film evaporators, which cause the polymeric antioxidant to be agitated during melt processing are preferred.

Description of The Drawing

The recovery process of this invention can be further described with reference to the drawing. There, a reactor 10 is shown. Catalyst, (aluminum cresolate in excess p-cresol-PC) is charged via conduit 11; phenolics (a mixture of bis-phenol A-BPA, hydroxyanisole-HA, tertiarybutylhydroquinone-TBHQ, tertiarybutylphenol-TBP) are charged via conduit 12; divinylbenzene-DVB (70-80% purity) is charged via conduit 14; xylene solvent is added via conduit 15. The mole ratios of phenolics, diolefin and catalyst are as follows.

| BPA | 3 | |
|-----|-----|-----|
| HA | 12 | |
| TBHQ | 4 | |
| TBP | 7.5 | |
| DVB | 2.15 | equiv. per mole of total phenolics |
| PC | 3.5 | |
| Al | 1 | |

The xylene solvent results in 50-60%w concentration reaction mixture. This mixture is heated to 125° C. by means not shown while stirring with agitator 16 driven by motor 17. The temperature is raised to 145° C. and there maintained for a total heating of 2½ hours. The mixture is then cooled to 60°-80° C. Diethyl ether in a volume about twice that of the volume of xylenes is added via conduit 15. After mixing, the reactor contents are passed through conduit 19 to extraction vessel 20. A 10% by weight aqueous solution of sulfuric acid catalyst extractant (similar in volume to the volume of reactor contents) is added to vessel 20 via conduit 21 and the mixture stirred for 10 minutes with agitator 22 powered by motor 24. Stirring is stopped and the aqueous acid phase carrying the aluminum catalyst separates and settles. The acid phase is drawn off via conduit 25 and 26 to optional catalyst recovery means 27. In 27, aluminum catalyst and/or aqueous acid can be recovered and recycled respectively to catalyst feed conduit 18 via conduit 30 and to catalyst extractant feed conduit 21. Alternatively, the catalyst and/or the aqueous acid are discarded via conduit 29. The acid extraction is repeated twice and is followed by repeated water rinses (water provided via conduit 21, also) until the rinse water is essentially neutral. The catalyst-free reaction mixture is then passed via conduits 25 and 32 to solvent still pot 34 to adjust the mixture's solvent and diluent content. The mixture is stirred by agitator 35 driven by motor 36. A vacuum of about 100 mm Hg absolute is applied via means not shown in conduit 37. The contents of still pot 34 are heated and ether, water, and xylene solvent vapors are withdrawn through conduit 37. Heating is continued until a still pot bottoms temperature of about 130° C. is achieved. This corresponds to a residual solvent content in the bottoms of 15-25% by weight. When this solvent level is achieved, the still pot contents are passed at via conduit 39 to metering pump 40 by which they are fed via conduit 41 to wiped film evaporator 42. Evaporator 42 comprises outer housing 43, internal rotating wiper blade 44 driven by shaft 45 and motor 46, and base 47. Outer housing 43 is maintained at a temperature of 350°-375° C. A vacuum of less than 1 mm Hg absolute is pulled on evaporator 42 via conduits 49 and 51. As the still pot bottoms are fed they are spread on the inside of heated housing 43 by rotating wiper blade 44. The feed rate is controlled to give a mean residence time for the still pot bottoms in the evaporator of about 2-3 minutes. The clearance between blade 44 and housing 43 is such that the surface area of the liquid is about 10-15 square cm per gram.

As liquid is fed, it moves from the feed end of evaporator 42 to the product end. Remaining solvents are stripped off by the wiped film evaporator to a residual level of about 25 ppm of xylene and 25 ppm of ether. Low molecular weight polymer products and residual feedstocks are also removed. The feed to the wiped film evaporator contains:

| xylene + ether | ~20% by weight |
|---|---|
| DVB monomer | 0.11% |
| HA monomer | 0.07% |
| Naphthalenes | 0.5% |
| Polymer with weight <500 daltons | 5% |
| Polymer with weight from 500 to 1000 daltons | 10% |

The antioxidant product is withdrawn from the evaporator via conduit 49. The removed solvents, monomers and low polymers are carried to condenser 49 where low polymers are separated and removed via conduit 50. Solvent and monomer vapor are passed via conduit 51 to trap 52 where solvent and monomer are condensed. A vacuum (1 mm Hg) is drawn via conduit 54. The materials collected in trap 52 are passed via conduit 55 to solvent recovery means 56. The solvents carried by conduit 37 also go to solvent recovery means 56. The recovered solvents may be passed to waste via conduit 57 but preferably are returned to solvent feed conduit 15 via conduit 58.

In this FIGURE, the thin film processing is shown being carried out continuously while the reaction, extraction, and solvent content adjustment are done in a batch mode. For this type of polymerization batch operation is generally the mode of choice. The extraction and solvent content adjustment could be carried out continuously, however. When the solvent adjustment is carried out batchwise, as shown in the FIGURE, it is often desirable to include two additional steps in the process. These steps are (1) cooling and solidifying the product of still pot 34 and (2) continually melting portions of the solidified still pot product and continuously feeding this melted product via pump 40 and conduit 41. These added steps avoid any chance of degradation of the antioxidant product which might occur if a large batch of still pot product was held as a melt during a long period of continuous feeding to evaporator 42, such as 48–72 hours. Periods of 24 hrs. or so can generally be tolerated.

The Antioxidant Products

The antioxidant products recovered by the present process are defined by general structural formula I.

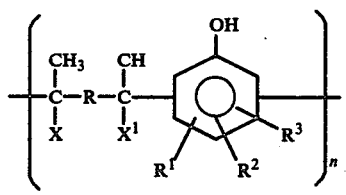

wherein X and $X^1$ independently are hydrogens or methyls, R is a lower alkyl of from 1 to 6 carbon atoms or an aryl, alkaryl or aralkyl of from 6 to 14 carbon atoms, $R^1$, is hydrogen or hydroxyl and $R^2$ and $R^3$ independently are hydrogen, lower alkyls of from 1 to 6 carbon atoms, aralkyls of from 8 to 14 carbon atoms, or alkoxys or aralkyloxys of from 1 to about 14 carbon atoms, with a variety of different $R^1$, $R^2$ and $R^3$ — substituented phenols being possible in a single antioxidant. These are the products which result when diolefin is condensed with one or more hydroxyaromatics in the presence of a condensation catalyst such as a Lewis acid or an aluminum, hafnium or zirconium "phenol orthoalkylation" catalyst.

The diolefin reactant from which the antioxidant product is formed is a hydrocarbon of formula II,

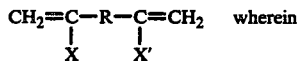

X and X' independently are hydrogen or methyl, R is a lower alkyl of from 1 to 6 carbon atoms, or an aryl, alkaryl or aralkyl of from 6 to 14 carbon atoms. The diolefins have their olefinic groups in terminal positions rather than in internal positions. They may contain additional unsaturation beyond the two olefinic unsaturations in the form of aromatic rings, but otherwise are saturated.

Thus, typical diolefins include the lower alkadienes, both linear and branched such as, 1,4-pentadiene, 1,5-hexadiene, 3-ethyl-1,5-hexadiene, 1,8-nonadiene and 3,5-dimethyl-1,7-octadiene; the diolefinic aryls, 1,4-diisopropenylbenzene and 1,3-diisopropenylbenzene, 1,4-divinylbenzene and 1,3-divinylbenzene; the diolefinic alkaryls, 2-methyl-1,4-divinylbenzene, 2-isopropyl-1,3 or 1,4-divinylbenzene, 2-t-butyl-1,4-divinylbenzene, 2,3-dimethyl-1,4-divinylbenzene and 2,5-di-t-butyl-1,4-divinylbenzene; and the aralkyls, 1-vinyl-4-(propyl-2-ene)benzene and 1-vinyl-3-(butyl-3-ene) benzene. These are merely illustrative and should not be interpreted as limiting the diolefin component. Combinations of two or more diolefins can be employed, if desired.

Preferred among the diolefinic compounds are those compounds in accordance with Formula II wherein X and X' are hydrogen and R is an aryl or an alkaryl of from 6 to 14 carbons inclusive. Preferred among these are the divinylbenzenes including 1,4- and 1,3-divinylbenzene and the 1,4- and 1,3-divinylbenzenes which carry 1 or 2 alkyl ring substituents each from 1 to 4 carbons inclusive such as 2-methyl-1,4- or 1,3-divinylbenzene, 2-t-butyl-1,4 or 1,3-divinylbenzene and 2,5-di-t-butyl-1,4 or 1,3-divinylbenzene. Most preferred diolefins include 1,4- and 1,3-divinylbenzene and mixtures thereof.

The phenolic component of the polymeric antioxidants recovered by the present process are defined by general structural formula III.

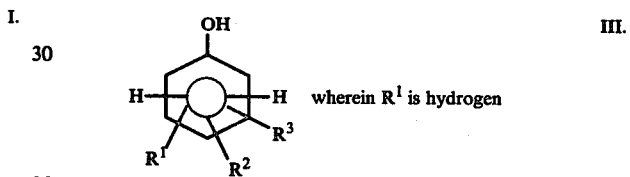

wherein $R^1$ is hydrogen or hydroxyl and $R^2$ and $R^3$ independently are hydrogen, lower saturated alkyls of from 1 to 6 carbon atoms, aralkyls of from 8 to 14 carbon atoms, or alkoxys or aralkoxys of from 1 to about 14 carbon atoms. Thus, the term "phenolic" as used herein can and is expressly defined to include hydroquinonoid materials, bis-phenols, as well as the substituted and unsubstituted monohydroxybenzenes.

When $R^1$ is hydroxy and thus the phenolic is of a hydroquinonoid structure, it is preferred to place $R^1$ in the 4-position on the aromatic ring. Suitable hydroquinonoid phenolic reactants include for example, 1,4-dihydroxybenzene, 2,3- or 2,5- or 2,6-dimethyl-1,4-dihydroxybenzene, 2-ethyl-1,4-dihydroxybenzene, 2-t-butyl-1,4-dihydroxybenzene, 2-methyl-5-t-butyl-1,4-dihydroxybenzene 2-(2-phenylethyl)-1,4-dihydroxybenzene, and 2,4-di(2-(4-vinyl)phenylethyl)-1,4-dihydroxybenzene. Preferred hydroquinonoid phenolic reactants include hydroquinone and 1,4-dihydroxybenzenes carrying one lower branched or linear alkyl group of from 1 to 5 carbon atoms. Hydroquinone, 2-methyl-, 2-t-amyl- and 2-t-butyl-1,4-dihydroxybenzene are most preferred hydroquinonoid reactants. Two or more hydroquinonoid phenolics may be employed.

When $R^1$ is hydrogen, and the phenolic is thus of a monohydroxy or bisphenol structure, it is preferred if two of the hydrogens on the aromatic ring be positioned in the 2 and 6 positions. Examples of these phenolic reactants are phenol, the cresols (i.e., 3- or 4-methylphenol), 3-methyl-4-t-butylphenol, 3- or 4-t-butylphenol, nonylphenol (generally available as a mixture of isomers), 3- or 4-[1-(4-ethyl)phenylethyl]phenol; 3-t- butyl-4[1-phenylethyl]phenol 4-hydroxyanisole, bisphenol A and the like. Mixtures of such phenolics may be employed as well.

Among these reactants, several combinations can be pointed out as especially preferred. These include the combination of DVB as diolefin with phenolics in the ratio of

| TBHQ | 1 part and |
|---|---|
| PC | .05 to 1 part; and |
| TBHQ | 0.2 to 0.4 part |
| HA | 0.5 to 1 part |
| TBP | 0.3 to 1 part |
| BPA | 0.1 to 0.3 part and |
| PC | 0 to .4 part |

In preparing the antioxidants recovered by the present process, a catalyst is employed. This catalyst may be any of the materials known to catalyze the ring alkylation of hydroxyaromatics. Such materials include Lewis acids such as $H_2SO_4$, HCl, $AlCl_3$, $BF_3$ and the like which catalyze alkylation in both the ortho and para positions on hydroaromatic rings. Other useful, and generally preferred, catalysts are those materials which give preferential alkylation in the ortho position. Such materials include for example, the metal phenolates described by Ecke and Kolka in U.S. Pat. No. 2,831,989 issued Apr. 22, 1958 i.e., phenoxy derivatives of Al, Mg, Fe, Zn, P, As, Sb, Bi and Sn; the polymeric or supported aluminum alcoholates set forth by Yeakey et al in U.S. Pat. No. 3,733,365 issued May 15, 1973; the aluminum mixed salts described by Hokama in U.S. Pat. No. 3,267,154 issued Aug. 16, 1966; and the metals of the 5th and 6th Periods of Groups IV-B and V-B taught by Leston in his U.S. Pat. No. 3,331,879 issued July 18, 1967, i.e., Zr, Hf, Nb and Ta. Aluminum is a preferred catalytic material for achieving ortho alkylation.

The preparation reaction is carried out under hydroxyaromatic ring alkylation conditions. Such conditions may be summarized as being in liquid phase, preferably in a liquid reaction solvent; being at elevated temperature; being for a relatively long period of time such as for at least an hour and being in the presence of an effective amount of a catalyst for alkylation of hydroxyaromatic rings.

As solvent for the preparation reaction are preferably employed organic liquids having an essentially aprotic character. Ethers, aromatic hydrocarbons and cycloaliphatic hydrocarbons are representative of suitable solvents. Examples of suitable solvents include lower aliphatic ethers such as diethyl ether, diisopropyl ether, and di-n-butyl ether; other ethers such as tetrahydrofuran, glyme (1,2-dimethyoxyethane), diglyme, anisole, diphenyl ether and phenetole, and the aromatic and cycloaliphatic liquid hydrocarbons of up to about 12 carbon atoms such as xylenes, mesitylene, ethylbenzene, pseudocumene, benzene, cyclohexane, diethylcyclohexane and the like. In some cases, pure ethers give rise to gels. This is solved when hydrocarbons are employed as cosolvents. Preferred solvents include xylenes and trimethylbenzenes, and mixtures of ethers and aromatic hydrocarbons. Mixtures of 5 to 75% ethers with aromatic hydrocarbons and xylenes alone are most preferred solvents. These solvents are also the liquids which are present in the crude reaction products which are purified by the present process.

The preparation reaction is carried out at elevated temperatures such as from about 80° C. to about 250° C.

The reaction times employed to effect production of the polymers are inversely dependent upon the reaction temperature employed. Generally times of from about 1 hour to about 48 hours are employed. The relative amounts of reactants and catalyst are controlled. The molar ratio of diolefinic reactant to total phenolic reactants can range from about 1:2 to about 2:1.

A crude reaction product would typically contain 30–80% solvent and liquid diluent. It would also contain the following (on a solvent-free basis):

| Polymer with molecular weight above 1000 Daltons | 75 to 90% by weight |
|---|---|
| Polymer with molecular weight from 500–1000 Daltons | 8 to 16 |
| Polymer with molecular weight below 500 Daltons | 3 to 8 |
| Unreacted monomers and monomer contaminants | 0.2 to 4 |
| Catalyst | 0.001 to 0.1 |

Before this product is subjected to the melt purification and recovery step of this invention, the catalyst is removed and the solvent content is adjusted. Either of these two steps may be done first.

The catalysts generally may be removed by extraction such as with a aqueous strong mineral acid such as HCl, $H_2SO_4$, HBr, $H_3PO_4$, $HNO_3$, $HClO_4$ or the like. The concentration of such acid is not critical and may suitably be in the range of from 1–2% to 10–20% by weight. The amount of acid employed should always be in excess of the exact stoichiometric requirements. Following acid extraction, the reactor product is rinsed with water until a pH of 5–7 is achieved.

In the solvent content adjustment step, the abovedescribed solvents and/or diluents are removed or added to reach a solvent content of the product of from 0 to 50% by weight (basis reaction mixture). This is done for two reasons. It is generally cheaper to remove gross amounts of solvent in a simple vacuum pot still or stripper than in a thin film evaporator unit. Also, the rapid evaporation of gross amounts of solvents in a thin film evaporator leads to too great cooling and possibly solidification of the polymer product in the feed areas of thin film evaporator equipment. It is preferred to have a solvent content of from about 5% to about 50% by weight. Solvent contents of from 10–30% are more preferred. These contents result in a desired substantial turbulent flow of solvent vapor in the thin film evaporator equipment. If the catalyst-free product does not have these levels of solvent, solvent can be added.

A final product would typically have the following composition:

| Polymer with molecular weight above 1000 Daltons (by difference) | 90–97% |
|---|---|
| Polymer with molecular weight between 500 and 1000 Daltons | 3–10% |
| Polymer with molecular weight less than 500 Daltons (Di & Trimers) | 0.01–0.30 |
| Solvents and liquid diluents | 10–50 ppm |
| Monomers | 15–75 ppm |

The process of the present invention will be further described by the following Examples. These are intended to illustrate the invention and are not to be interpreted as limiting its scope, which scope is defined by the appended Claims.

EXAMPLE I

A. A 50 liter flask was equipped with a stirrer, an argon bleed, a thermowell, and a vacuum condenser. A catalyst solution was prepared by gradually adding to the flask 24 g of metallic aluminum and a mixture of 380 (3.5 moles) of PC and 300 ml of xylene and heating to 150° C. with stirring until hydrogen evolution diminishes. Then, to the flask was charged 1490 g (12 moles) of HA, 663 g (4.0 moles) of TBHQ, 685 g (3.0 moles) of BPA, 1127 g (7.5 moles) of TBP, and about 4.5 liters of xylene. Then, 4.7 kg of ~75% pure DVB (23% ethylvinyl benzene 2.0% naphthalenes) was added with stirring and a 2.5 liter xylene rinse. The reaction mass was heated to 125° C. with stirring. The reaction slowly exothermed to 140°–145° C. and was there maintained until 2.5 hours had elapsed (since initial heating). The reaction flask was then cooled to 75° C. and 6 liters of diethylether was gradually added. The reaction mass was further cooled to below 65° C. and diluted to 30 liters with diethylether—i.e. to a solvent and diluent content of about 75%.

B. The reaction product was treated as follows: first, catalyst was removed. This removal could be effected in a separate vessel but in this experiment was done in the reaction vessel. The ether solution was extracted 3 times with a total of about 50 liters of 10%w sulfuric acid to remove aluminum. The organic phase was then extracted with deionized water until the rinses had a pH above 5.5.

C. About half of the catalyst-free reaction product was charged to a 22 liter flask equipped with a stirrer, a heater and a vacuum condenser. A 400 mm Hg vacuum was drawn on the flask and it was heated to 100° C. Some ether and other solvents were taken off. The remaining reaction product was gradually added and the temperature and vacuum were increased. When the internal temperature reached 130° C. at 100 mm Hg absolute pressure, heating was discontinued. The liquid residue could be fed directly to a thin film melt processor but was in this case drained from the flask and permitted to harden. This material had the following composition:

| Solvents (ethers plus xylenes) | 15–25% |
|---|---|
| PC | 580 ppm |
| EVB + DVB | 1250 ppm |
| HA | 490 ppm |
| Naphthalenes | 0.4% |
| TBP | 510 |
| Dimer (MW 300–500) | 0.6–0.7% |
| Trimer (MW 500–700) | 1.5–2.0% |

D. Later, a portion of the solid crude antioxidant was melted at 100° C. and fed as a liquid to a 0.25 sq. ft. process section wiped film evaporator (a Rototherm$^{TM}$ evaporator sold by Artisan Industries). This evaporator was operated at a wall temperature of 363°–368° C. The feed was preheated to 195°–205° C. The absolute pressure in the evaporator was 0.7 to 1.3 mm. The feed rate was about 0.55 kg/hour. The thickness of melted antioxidant on the wiped film evaporator walls was about 0.75 mm. The residence time in the wiped film evaporator was about 2 minutes. The bottom product of the wiped film evaporator was collected and showed the following analysis:

| solvent | 17 ppm |
|---|---|
| PC | ≦10 ppm |
| EVB + DVB | ≦25 ppm |
| HA | <10 ppm |
| Naphthalenes | 6 ppm |
| TBP | <10 ppm |
| Dimer | <0.05% |
| Trimer | 0.05–0.10% |

Thus, a high purity polymeric antioxidant product having minimal amounts of low molecular weight contaminants was achieved.

COMPARATIVE EXPERIMENT I

For purposes of comparison, the preparation of Example I, part A and the catalyst acid extraction of Example I, part B were repeated on a 1/5th scale. Instead of the melt processing technique of this invention, a precipitation process was used to recover the product. The catalyst-free product was dried by adding 1.4 kg of anhydrous sodium sulfate with stirring for 1 hour. The drying salt was filtered off and ether was added to a total volume of 6 liters. This reaction product contained about 4 liters of ether and the following impurities:

| on an ether-free basis | |
|---|---|
| solvents | 17%w |
| PC | 0.05 |
| EVB + DVB | 0.1 |
| HA | 0.5 |
| Naphthalenes | 0.5 |
| Dimer | 1.5 |
| Trimer | 3.0 |

The polymer product was then recovered by precipitation which resulted when the diethylether solution was added over about 2 minutes to 54 liters of vigorously stirred hexane. The hexane mixture was filtered. The solids were washed with hexane and sucked dry. Then, the solids were dried in a 90° C. vacuum drying oven under an argon bleed at 3–5 mm HG absolute pressure for 48 hours. In a typical one of several repeats of the reaction just described about 1.4 kg of an off-white product was recovered. This product had the following contaminants.

| Hexane + Ether | 0.9%w |
|---|---|
| Xylene | 0.4 |
| PC | 0.008 |
| EVB + DVB | 0.025 |
| HA + Naphthalenes | 0.06 |
| Dimer | 0.3 |
| Trimer | 0.4 |

This experiment shows that the melt processing technique leads to substantially reduced impurity levels and thus a product much more likely to show essentially complete nonabsorption from the gastrointestinal tract.

EXAMPLE II

Additional portions of the product of Example I, part C were fed to the wiped film evaporator while varying the evaporator conditions. Temperature was varied from 300° to 366° C. Pressure was varied from 0.6 to 1.3 mm Hg. Residence time was varied from 0.2 to 4 minutes.

The product which resulted during steady state operation within these ranges was of high purity containing less than 0.15% dimer and trimer and less than 0.008% of monomers, solvents and diluents.

EXAMPLE III

Aluminum metal (0.3 mole), p-cresol (6.0 mole) and 2 liters of p-xylene are heated in a 160°-170° C. oil bath until all the metallic aluminum reacts to form an aluminum cresol complex. 30 moles of hydroquinone, and 3 liters of diisopropyl ether are added and the mixture is refluxed for about two hours. Then 75% pure divinylbenzene (about 37 moles) is added and the mixture is refluxed for 16 hours (at 135° C.) to yield a gum-like material and an almost colorless liquid. Additional ether is added to dissolve the gum-like material. The organic solution is placed in a large separatory funnel and is extracted four times with 1 N HCl to remove catalyst and is rinsed free (to pH 5.5 or more) of acid with water.

The organic phase contains over 50% ethers and p-xylene. A portion of the organic phase is evaporated under vacuum until a semisolid polymer mass is obtained. The polymer making up this mass has the formula

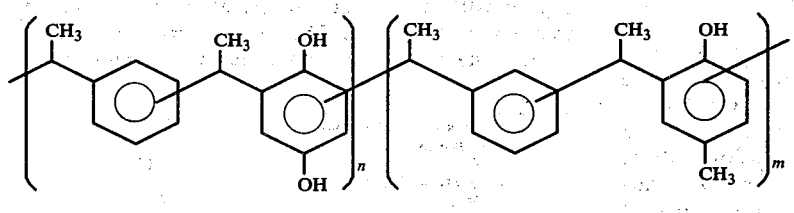

wherein $m$ and $n$ are numbers greater than 1. The crude product contains about 30% ethers and xylenes and about 4% of monomers and dimers of molecular weight below 500 Daltons and 10% of materials of molecular weight between 500 and 1000 Daltons.

This material is melted and fed as a melt to the Artisan wiped film evaporator described in Example I at a rate of 0.25 kg per hour. The residence time is ~4 minutes. The bottoms temperature is 320° C. The absolute pressure is 1 mm Hg.

The product which results is of high purity. It contains less than 25 ppm of xylenes and ethers, less than 25 ppm of divinylbenzene and other 10 carbon aromatics and less than 50 ppm of monomeric phenolics. The total amount of materials with a molecular weight below 500 Daltons is below 0.2%.

COMPARATIVE EXPERIMENT II

Another portion of the catalyst-free reaction product of Example III is treated by precipitation. In this method, it is first evaporated to dryness, dissolved in diethyl ether, and precipitated in a 20:1 hexane:ether mixture. The precipitate is rinsed and dissolved in ether and reprecipitated. A total of three precipitations are carried out. The final precipitate is dried in a vacuum shelf drier for 48 hours at 90° C. and 1-5 mm Hg pressure. This yields a polymer product which is higher in low molecular weight contaminants than the product of Example III. (>1% less than 500 Daltons) This process with its three precipitations, has a low yield (<60%).

EXAMPLE IV

The preparation of Example III is repeated. The crude product is melted and fed as a melt to a Werner and Pfleiderer Twin Screw Devolatilizing Extruder (model ZDS K28) at a rate of 0.5 kg/hour. The wall temperature of the extruder is 355°-360° C., the vacuum in the extruder is 0.5-2 mm. The extruder screws are run at from 40 to 150 rpm giving residence times of from 5 to 1 minutes. The product which results has low solvent, monomer and light polymer contents - essentially equivalent to the product of Example III.

What is claimed is:

1. The process for recovering a diolefin-phenolic copolymer antioxidant from a crude condensation reaction product containing the copolymer, reaction solvent, catalyst and monomers and polymeric contaminants having a molecular weight below about 500 Daltons which comprises:
    A. removing catalyst from the reaction product and adjusting the reaction solvent content into the range of up to 50%w to yield an adjusted reaction product,
    B. fusing the adjusted reaction product and maintaining the fused product at a surface area of not less than 4 cm$^2$ per gram, a temperature of from 200° C. to 425° C. and an absolute pressure of from 0.1 to 10 mm Hg for from 0.5 to 7.5 minutes thereby forming an overhead fraction comprising solvent, monomers and low molecular weight polymeric contaminants and a bottoms fraction consisting essentially of the copolymer antioxidant and,
    C. recovering the copolymer antioxidant-containing bottoms fraction.

2. The process of claim 1 wherein the reaction solvent content of the crude condensates reaction product is over 50%w and, wherein in Step A the reaction solvent content is adjusted by stripping into the range of 10-50%w.

3. The process of claim 2 wherein in Step B the temperature in the range of from 250° to 400° C., the pressure is from 0.1 to 5 mm Hg.

4. The process for recovering a diolefin-phenolic copolymer antioxidant contaminated with not more than 0.3% of materials having a molecular weight less than 500 Daltons from a condensation polymerization reaction product comprising the copolymer antioxidant, greater than 50%w basis reaction product of reaction solvent, greater than 4000 ppm basis antioxidant of unreacted phenolic and diolefinic monomers, greater than 3% (basis antioxidant) of condensation products having a molecular weight less than 500 and a polymerization catalyst; which process comprises the steps of:
    A. removing the polymerization catalyst by extraction with aqueous mineral acid and stripping reaction solvent from the reaction product to adjust the solvent level to from 10% to 50%w basis reaction product to form a catalyst-free reaction product.
    B. Maintaining the catalyst-free reaction product as a melt at a temperature of from 250° C. to 400° C. at an absolute pressure of from 0.1 mm Hg to 5 mm Hg at a surface area of the melt of from 6 cm$^2$/gram to 30 cm$^2$/gram for from 1 to 5 minutes to form an overhead fraction composed of solvents, monomers and low molecular weight contaminants and a bottoms fraction consisting essentially of the diolefin-phenolic copolymer antioxidant and not more than 50 ppm of solvents and not more than 0.3% by weight having a molecular weight less than 500 Daltons and C. separating and recovering the bottoms fraction.

5. The process of claim 4 wherein step B is effected in a wiped film evaporator.

6. The process of claim 5 wherein the diolefin-phenolic copolymer antioxidant comprises the following constituents: divinylbenzene, tertiarybutylhydroquinone and paracresol.

7. The process of claim 6 wherein the antioxidant additionally comprises hydroxyanisole, tertiarybutylphenol and bisphenol A.

8. A diolefin-phenolic copolymeric antioxidant characterized as containing not more than 0.3% by weight of materials having a molecular weight below 500 Daltons and from 3 to 10% by weight of materials having a molecular weight between 500 and 1000 Daltons, said antioxidant being the product of the process which comprises:

A. Condensing a diolefin and one or more phenolic oxyhydrocarbons in the presence of a catalyst to yield a crude condensation reaction product comprising the copolymer antioxidant, reaction solvent, catalyst and monomers and polymeric contaminants having a molecular weight below 500 Daltons, B. Removing catalyst from the reaction product and adjusting the reaction solvent content into the range of up to 50%w to yield an adjusted reaction product, C. Fusing the adjusted reaction product and maintaining the fused product at a surface area of not less than 4 cm$^2$ per gram, a temperature of from 200° C. to 425° C. and an absolute pressure of from 0.1 to 10 mm Hg for from 0.5 to 7.5 minutes thereby forming an overhead fraction comprising solvent, monomers and low molecular weight polymeric contaminants and a bottoms fraction consisting essentially of the copolymer antioxidant and, D. Recovering the copolymer antioxidant-containing bottoms fraction.

* * * * *